(12) United States Patent
Hind et al.

(10) Patent No.: US 8,731,552 B2
(45) Date of Patent: *May 20, 2014

(54) METHODS AND APPARATUS FOR SELECTING A COMMUNICATION NETWORK

(75) Inventors: Hugh Hind, Waterloo (CA); Mark Edward Church, Waterloo (CA); Noushad Naqvi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,002

(22) Filed: Sep. 21, 2011

(65) Prior Publication Data

US 2012/0243436 A1    Sep. 27, 2012

Related U.S. Application Data

(63) Continuation of application No. 12/119,856, filed on May 13, 2008, now Pat. No. 8,036,654, which is a continuation of application No. 11/393,962, filed on Mar. 30, 2006, now Pat. No. 7,389,109, which is a continuation of application No. 10/696,980, filed on Oct. 30, 2003, now Pat. No. 7,184,768.

(60) Provisional application No. 60/422,124, filed on Oct. 30, 2002.

(51) Int. Cl.
*H04W 4/00* (2009.01)

(52) U.S. Cl.
USPC ........ 455/435.2; 455/436; 455/437; 455/438; 455/439; 455/440; 455/441; 455/442; 455/443; 455/444; 455/435; 455/434; 455/433; 455/432

(58) Field of Classification Search
CPC ..... H04W 60/00; H04W 60/02; H04W 60/04; H04W 60/06; H04W 36/00; H04W 48/18; H04W 36/24; H04W 36/30; H04W 36/32; H04W 36/34; H04W 36/14

USPC ............ 370/328, 331, 352; 455/432.1, 432.2, 455/432.3, 433, 434, 435.1, 435.2, 435.3, 455/436–444, 552.1

See application file for complete search history.

(56) References Cited

U.S. PATENT DOCUMENTS

| | | | |
|---|---|---|---|
| 4,670,899 A | 6/1987 | Brody et al. | |
| 5,442,806 A | 8/1995 | Barber et al. | |

(Continued)

FOREIGN PATENT DOCUMENTS

| | | |
|---|---|---|
| EP | 1509052 A1 | 8/2003 |
| WO | 9949690 A1 | 9/1999 |

(Continued)

OTHER PUBLICATIONS

International Preliminary Examination Report for PCT application PCT/CA03/01661, Feb. 9, 2005.

(Continued)

*Primary Examiner* — Patrick Edouard
*Assistant Examiner* — Shantell L Heiber
(74) *Attorney, Agent, or Firm* — Moffat & Co.

(57) ABSTRACT

Network selection techniques for use in a mobile device which is configured for voice and packet data communications are described. The mobile device performs a scanning operation to identify one or more communication networks, and consults a network selection list for selecting, in accordance with assigned priorities of the list, one of the identified networks. The mobile device also determines whether a packet data service interconnection to a home network via the selected network is available. If the interconnection to the home network via the selected network is determined to be available, then the mobile device operates with voice and packet data services in the selected network. Otherwise, if the interconnection to the home network via the selected network is determined to be unavailable, then the mobile device repeats the acts of consulting and determining for the next identified network in the list.

18 Claims, 9 Drawing Sheets

(56) References Cited

U.S. PATENT DOCUMENTS

| | | | |
|---|---|---|---|
| 5,613,213 A * | 3/1997 | Naddell et al. | 455/435.2 |
| 5,826,218 A | 10/1998 | Khafizov et al. | |
| 5,869,573 A | 2/1999 | Kuroda et al. | |
| 5,896,573 A | 4/1999 | Yang et al. | |
| 5,903,832 A | 5/1999 | Seppanen et al. | |
| 5,999,811 A * | 12/1999 | Molne | 455/432.3 |
| 6,119,003 A | 9/2000 | Kukkohovi | |
| 6,128,489 A | 10/2000 | Seaholtz et al. | |
| 6,223,042 B1 | 4/2001 | Raffel | |
| 6,233,042 B1 | 5/2001 | Kanda | |
| 6,269,245 B1 | 7/2001 | Li et al. | |
| 6,278,882 B1 | 8/2001 | Choi | |
| 6,438,369 B1 | 8/2002 | Huang et al. | |
| 6,459,902 B1 | 10/2002 | Li et al. | |
| 6,487,415 B1 | 11/2002 | Eibling et al. | |
| 6,567,663 B1 | 5/2003 | Otting et al. | |
| 6,603,755 B1 | 8/2003 | Parker | |
| 6,625,451 B1 | 9/2003 | La Medica, Jr. et al. | |
| 6,629,245 B1 | 9/2003 | Stone et al. | |
| 6,798,784 B2 * | 9/2004 | Dove et al. | 370/463 |
| 6,801,777 B2 | 10/2004 | Rusch | |
| 6,836,653 B1 | 12/2004 | Kang | |
| 6,907,237 B1 | 6/2005 | Dorenbosch et al. | |
| 6,954,649 B2 | 10/2005 | Kotzin | |
| 6,961,563 B2 * | 11/2005 | Holler et al. | 455/432.1 |
| 7,043,239 B2 | 5/2006 | Uchida | |
| 7,096,015 B2 | 8/2006 | Bridges et al. | |
| 7,099,687 B1 | 8/2006 | Makela et al. | |
| 7,136,633 B2 | 11/2006 | Daly | |
| 7,433,929 B2 * | 10/2008 | Guilford et al. | 709/217 |
| 8,116,285 B1 | 2/2012 | Barnum | |
| 2002/0039892 A1 | 4/2002 | Lindell | |
| 2002/0058506 A1 | 5/2002 | Amin et al. | |
| 2002/0087674 A1 | 7/2002 | Guilford et al. | |
| 2002/0101859 A1 * | 8/2002 | Maclean | 370/352 |
| 2002/0119774 A1 | 8/2002 | Johannesson et al. | |
| 2002/0147012 A1 | 10/2002 | Leung et al. | |
| 2002/0177413 A1 | 11/2002 | Jouppi et al. | |
| 2003/0017828 A1 | 1/2003 | Kotzin et al. | |
| 2003/0069019 A1 | 4/2003 | Schwinke | |
| 2003/0112793 A1 | 6/2003 | Sengodan | |
| 2003/0119481 A1 | 6/2003 | Haverinen et al. | |
| 2003/0129971 A1 | 7/2003 | Gopikanth | |
| 2003/0189900 A1 | 10/2003 | Barany et al. | |
| 2004/0009751 A1 | 1/2004 | Michaelis et al. | |
| 2004/0109431 A1 | 6/2004 | Abrahamson et al. | |
| 2004/0192301 A1 * | 9/2004 | Shi | 455/435.1 |
| 2004/0203692 A1 | 10/2004 | Schwinke et al. | |
| 2004/0203745 A1 | 10/2004 | Cooper | |
| 2004/0228347 A1 * | 11/2004 | Hurtta et al. | 370/395.2 |
| 2005/0148323 A1 | 7/2005 | Little et al. | |

FOREIGN PATENT DOCUMENTS

| | | |
|---|---|---|
| WO | 0131870 A2 | 5/2001 |
| WO | 0147316 A2 | 6/2001 |
| WO | 0209464 A1 | 1/2002 |
| WO | 2004040931 A2 | 5/2004 |

OTHER PUBLICATIONS

PCT Written Opinion for PCT application PCT/CA03/01661, Sep. 29, 2004.

International Search Report for PCT application PCT/CA03/01661, Apr. 13, 2004.

* cited by examiner

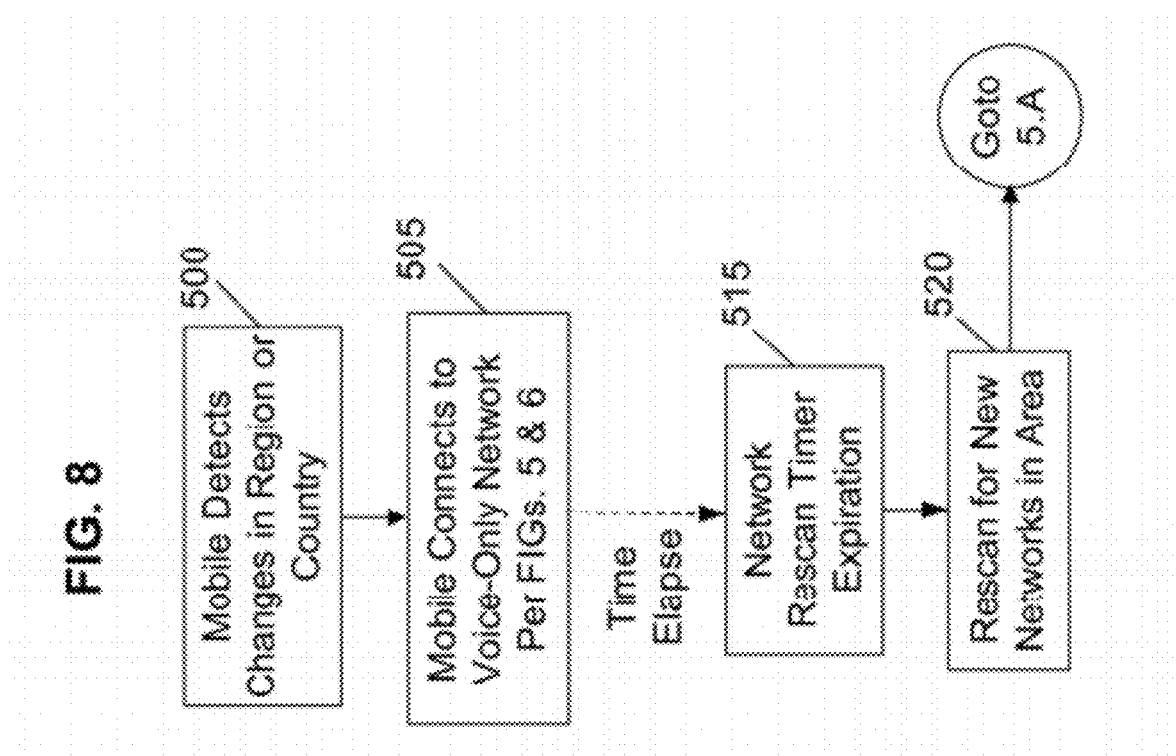

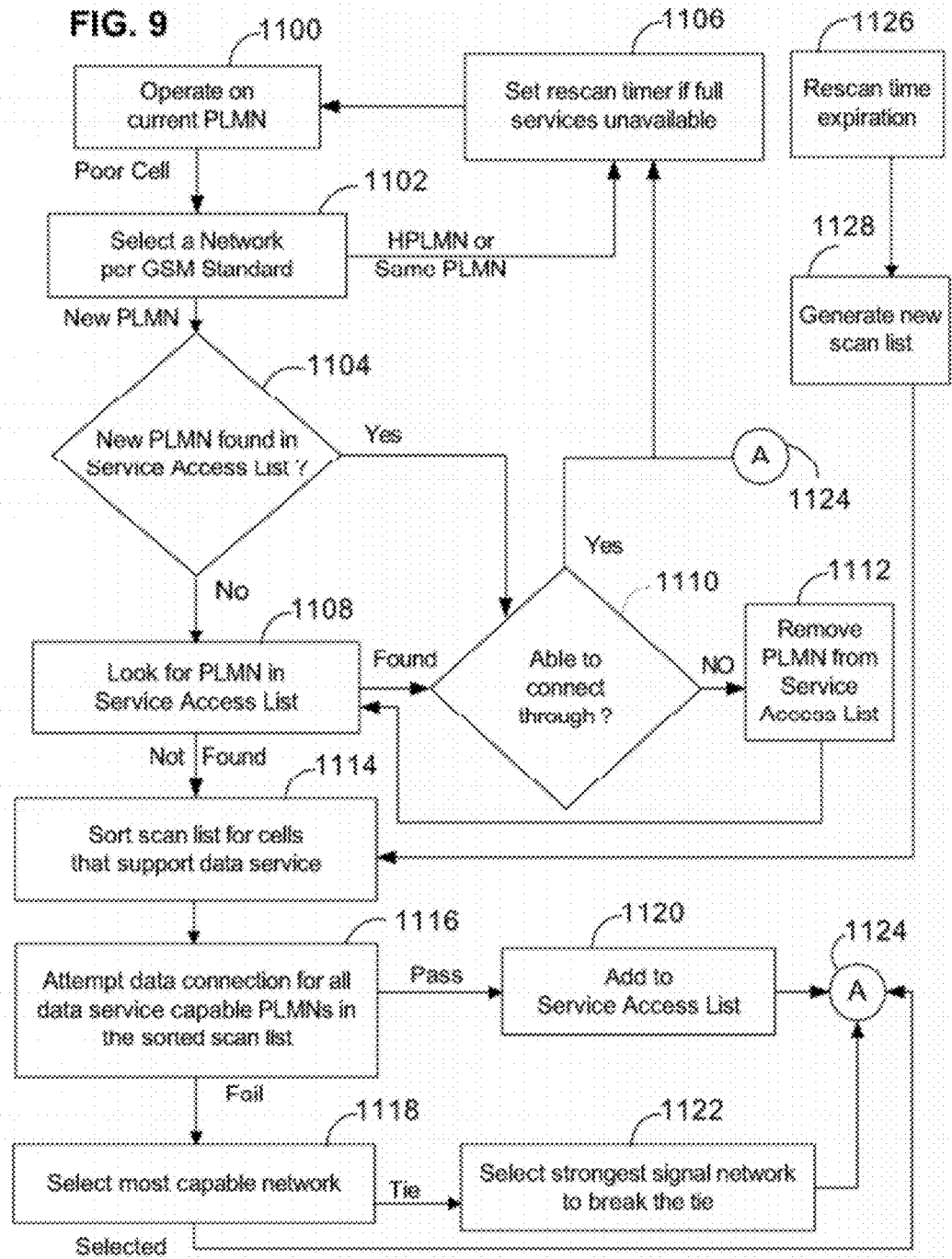

METHODS AND APPARATUS FOR SELECTING A COMMUNICATION NETWORK

CROSS-REFERENCE TO RELATED APPLICATIONS

This application is a continuation of and claims priority to a U.S. non-provisional patent application having application Ser. No. 12/119,856 and filing date of 13 May 2008, now U.S. Pat. No. 8,036,654, which is a continuation of and claims priority to a U.S. non-provisional patent application having application Ser. No. 11/393,962 and filing date of 30 Mar. 2006, now U.S. Pat. No. 7,389,109, which is a continuation of and claims priority to a U.S. non-provisional patent application having application Ser. No. 10/696,980 and filing date of 30 Oct. 2003, now U.S. Pat. No. 7,184,768, which claims priority to a U.S. provisional patent application having application No. 60/422,124 and filing date of 30 Oct. 2002, each application of which is hereby incorporated by reference herein.

BACKGROUND

1. Field of the Technology

The present disclosure relates generally to mobile communication devices, such as portable wireless e-mail devices operating over cellular telecommunications networks, and more particularly to a method of selecting a communication network over which to operate based on the availability of different communication services in the communication networks.

2. Description of the Related Art

A mobile communication device, such as a cellular mobile station, may be capable of making and receiving telephone calls and/or sending and receiving data over a wireless communication network. Before it is able to do this, the cellular mobile station selects and registers with one of a plurality of communication networks which are available within a given geographic coverage area. After registering with the selected network, the mobile station operates in an idle mode where it "camps-on" a particular wireless communication channel of the network to monitor for its calls or messages. "Network selection" is the particular process performed by the mobile station for selecting the one communication network over which to register and operate.

Cellular telephony operation and network selection schemes are documented in standards specifications that govern the behavior of cellular mobile stations and associated systems. One well-known cellular standard is the Global System for Mobile Communication (GSM) standard. GSM 03.22/European Technical Standards Institute (ETSI) TX 100 930, Technical Specification (TS) 23.122 from the 3.sup.rd Generation Partnership Project (3GPP), and other related standards specifications describe the many details of cellular operation and network selection. These documents describe how a mobile station behaves as it roams between various regions and countries to maintain communication network coverage, primarily for the purposes of providing continuous telephone service.

In such a network, a mobile station performs network selection by initially determining the signal strengths of each one of the available base stations in a given coverage area. Thereafter, it searches for these identified base stations within a preferred network list that is stored in memory. The mobile station then selects the base station with strongest signal that is listed in the preferred network list. There may be several preferred network lists, commonly referred to as preferred public land mobile network (PPLMN) lists, stored on the SIM card. For example, the PPLMN lists may include a home PPLMN list, a user-controlled PPLMN (U-PPLMN) list, and an operator-controlled PLMN (O-PPLMN) list.

The above-described network selection method is commonly referred to as an "automatic" network selection method. As an alternative to this automatic selection method, an end-user of the mobile station may be provided with the ability to manually select from a plurality of listed available networks which are visibly displayed on the mobile device. This conventional network selection method may be referred to as a "manual" network selection method.

Other portable devices, such as personal digital assistants (PDAs), laptop computers, and portable e-mail devices, are better known to provide for the organization and management of text, files, messages, and/or other data. However, mobile data communication services, such as wireless e-mail and Internet access services, are becoming more and more popular in connection with these devices. Mobile devices providing for combined capabilities (e.g. both voice and data communication) also exist and are becoming increasingly popular. In addition to operating in accordance with GSM for voice capabilities, these mobile devices may operate in accordance with well-known General Packet Radio Service (GPRS) standard. GPRS is a packet-based communication protocol for mobile devices that allows data to be sent and received across a mobile telephone network.

In order to operate fully as intended, these mobile devices must have the appropriate communication services supported and made available by the communication network that it is registered with. Ideally, all communication networks around the world should support and make available all the different types of communication services that a mobile device is capable of providing. In practice, however, some communication networks do not have or cannot make a particular communication service (e.g. a data communication service) available to a mobile device. This problem may be partially mitigated in a given coverage area as there may be several communication networks from which the mobile device may select.

Conventional network selection, however, does not take into consideration the availability of other services (e.g. data communication services) in its decision-making process. As a result, an inadequate communication network may be selected by the mobile device. For example, a mobile device may select a communication network that can provide an acceptable voice service but not a data service, even though another adequate and available network could provide both the voice and the data service. Such conventional operation is undesirable, especially for mobile devices that are primarily intended to provide the end-user with a data communication service (e.g. portable e-mail devices).

Accordingly, there is a resulting need for a method and apparatus for selecting a communication network that overcome the deficiencies of the prior art.

BRIEF DESCRIPTION OF THE DRAWINGS

FIG. 8 is a flowchart which describes an alternate rescanning method; and

FIG. 9 is a flowchart which describes an alternative method of network selection in accordance with the present application.

DETAILED DESCRIPTION OF THE PREFERRED EMBODIMENTS

Methods and apparatus for performing network selection by a mobile communication device are described herein. In situations where more than one wireless network is available in a given coverage area, a method of assigning priority to or selecting a wireless network that provides the "best" services for the mobile station is employed. Such methods are applicable to mobile devices that operate in accordance with any suitable communication standard, but are particularly applicable to advanced GPRS-capable mobile stations. In this environment, the method may place a priority on selecting a GPRS-capable network over a GSM-only capable network.

An advanced network selection method in a mobile communication device may involve determining that it has changed network coverage regions; identifying the presence of new communication networks having suitable signal strength in the new coverage region; determining which of the new networks support a data communication service used by the mobile device; comparing the new networks against preferred and forbidden network lists; and selecting the best communication network with which to register and operate. The selection may be based upon (a) comparing the signal strength of all communication networks; (b) attempting to match the new networks to a network on the preferred list; (c) identifying that the data network is not on the forbidden list or that the communication network is not on either list; and (d) confirming the level of support offered by the communication network.

Where the mobile communication device has been forced to select a network that supports only limited services (e.g. only a voice communication service), further methods for selecting or prioritizing a communication network may be used. When a mobile communication device is currently using a voice-only network, for example, an advanced network reselection method is employed which may involve (a) ensuring that a rescan timer is set; (b) when the rescan timer expires, performing a search for any new communication network that was not previously available; (c) determining if the new network makes better communication services available than the voice-only network; (d) confirming that the new network is either on the preferred network list, not on the forbidden network list, or not on either list; and (e) selecting the new network for registration.

Figure 1:
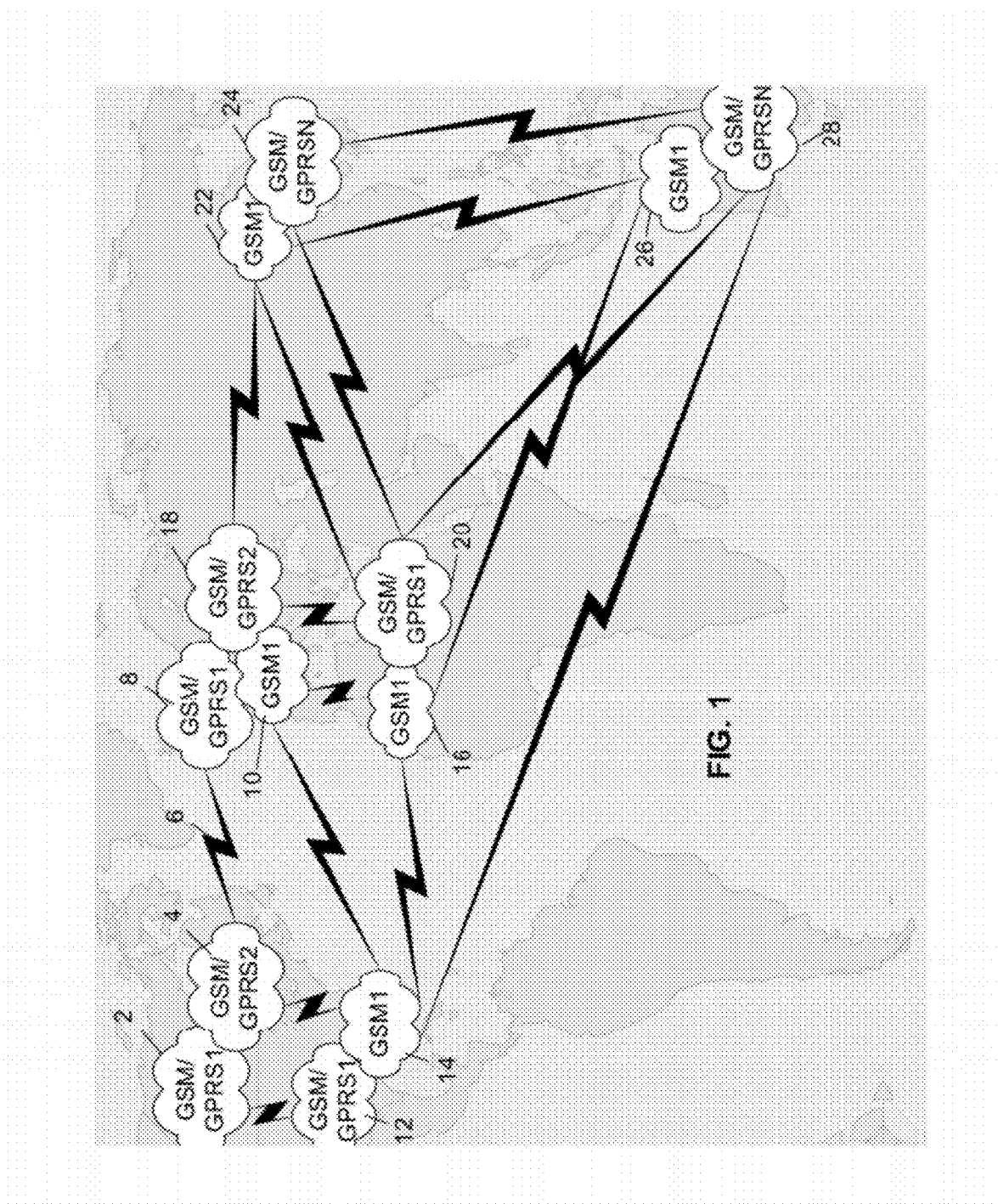
FIG. 1 is a block diagram illustrating a global network interconnection.

With reference now to FIG. 1, an overview of how networks connect around the world will be described. GSM and GPRS networks are shown as example wireless communication networks. The voice network known as GSM is the older component and has been available since about 1992 while GPRS, a data component that has been combined or overlaid with GSM, has been available only since about 1999. These two networks are now common throughout the world and have some of the fastest deployment rates of any voice and data networks. Such combined voice and data networks also include modem Code Division Multiple Access (CDMA) networks and third-generation (3G) networks like Enhanced Data-rates for Global Evolution (EDGE) and Universal Mobile Telecommunications Systems (UMTS), currently under development.

In FIG. 1, there are five GSM only networks 10, 14, 16, 22, 26 and eight GSM/GPRS combined networks 2, 4, 8, 12, 18, 20, 24, 28, shown in various parts of the world. At any point in time, a given country might have one or more GSM and/or GSM/GPRS networks. Each network operator makes financial and practical decisions as to when it should purchase and implement GPRS functionality onto an existing GSM network. Therefore, a user of a GSM phone or a GPRS capable mobile station might enter a given country and be faced with networks that support either GSM only or combined GSM/GPRS.

These networks implement interconnections to each other to support roaming between countries and to support billing and roaming notifications between networks. Although shown as separate physical networks in FIG. 1, the thirteen networks (five GSM and eight GSM/GPRS) interconnect to form a total of four networks—three GSM/GPRS networks 1, 2, and N, and one GSM network 1. A GSM network could connect to one or more other GSM networks, one or more GSM/GPRS networks, or both. A GSM/GPRS network could similarly connect with other GSM/GPRS networks, GSM networks, or both GPRS/GSM networks and GSM networks. Networks in Canada, shown as GSM/GPRS1 2 and GSM/GPRS2 4, respectively connect with GSM/GPRS1 12 and GSM1 14 shown in the USA. GSM/GPRS2 4 also connects with GSM/GPRS1 8 shown in the England area via communication link 6. Network GSM1 14 from the USA also connects with GSM1 10 shown in the middle of Europe. Other networks 16 through 28 are similarly interconnected as shown. These interconnections form the basis of traffic movement and roaming support between the networks.

As a mobile station enters a given country or communication network coverage area, it may be capable of communicating with one or more wireless GSM or GSM/GPRS networks to receive data and voice signals. In England, for example, there are currently four GSM or GSM/GPRS networks deployed and available for mobile stations to connect with. Normally, cellular telephones or mobile stations sold in England will only work with one network. However, mobile stations entering England from France might have two or three networks to select from. Selection of a particular network is currently performed by a mobile station randomly, based on the strongest received signal at the time of arrival into the country.

Figure 2:
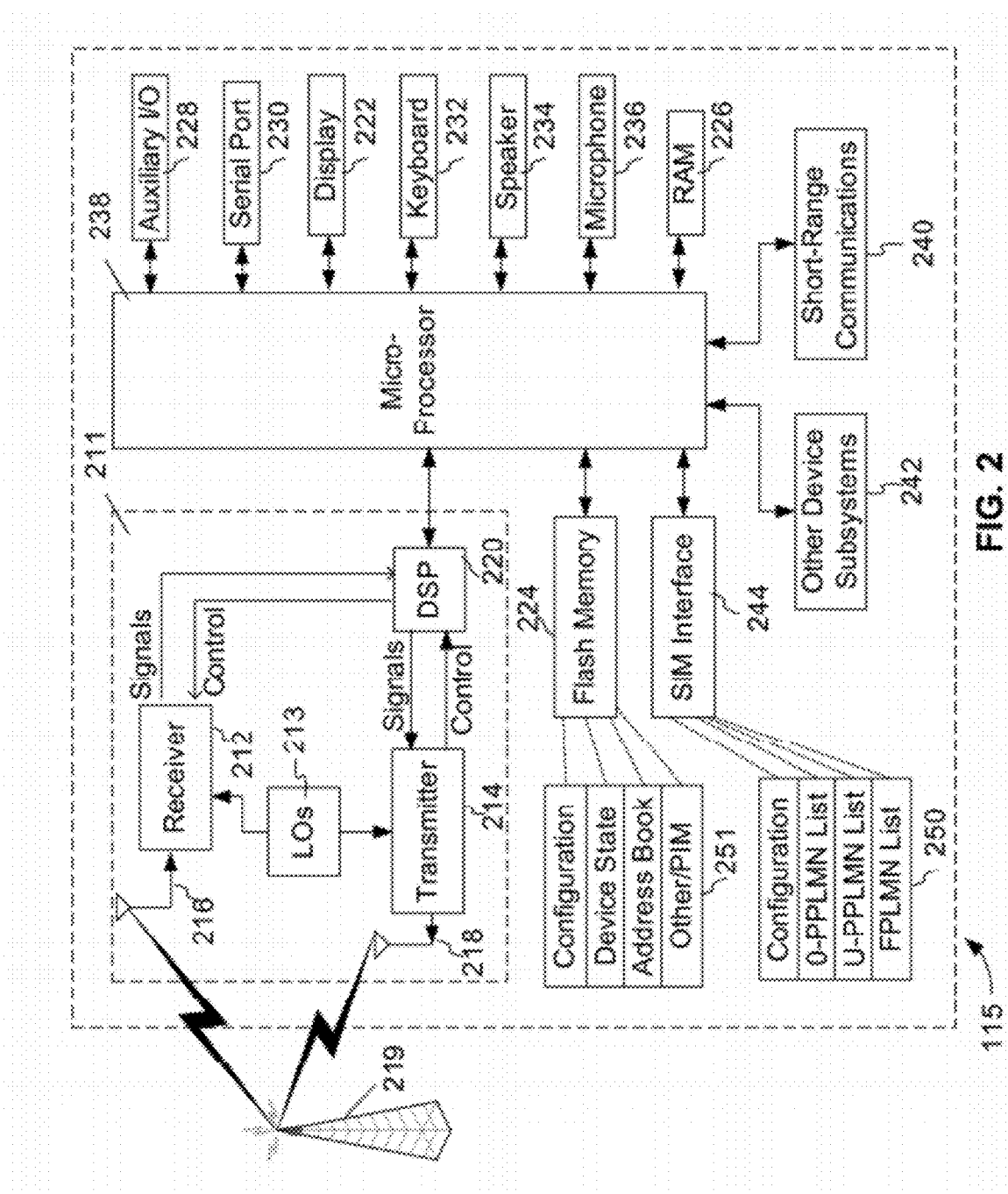
FIG. 2 is a block diagram of a mobile communication device which is a cellular mobile station.

Turning now to FIG. 2, a block diagram is shown of a cellular mobile station, which is one type of mobile communication device. Mobile station 115 is preferably a two-way wireless communication device having at least voice and data communication capabilities. Mobile station 115 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile station 115 is enabled for two-way communication, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate. For example, mobile station 115 may include a communication subsystem 211 designed to operate within the Mobitex™. mobile communication system, the DataTAC™. mobile communication system, or a GPRS network.

Network access requirements will also vary depending upon the type of network 219. For example, in the Mobitex and DataTAC networks, mobile station 115 is registered on the network using a unique identification number associated with each mobile station. In GPRS networks, however, network access is associated with a subscriber or user of mobile station 115. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 115 will be unable to carry out any other functions involving communications over the network 219. The SIM interface 244 is normally similar to a card-slot into which a SIM card can be inserted and removed. The SIM card can have approximately 64K of memory and hold many key configuration, identification, and subscriber related information 250. The O-PPLMN, the U-PPLMN, and the forbidden PLMN (FPLMN) are initially received from the SIM card 250. Reference to the PPLMN hereinafter will generally apply to both the O-PPLMN and U-PPLMN.

When required network registration or activation procedures have been completed, mobile station 115 may send and receive communication signals over the network 219. Signals received by antenna 216 through communication network 219 are input to receiver 212, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 219 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 115 preferably includes a microprocessor 238 which controls the overall operation of the device. Communication functions, including at least data and voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read-only memory (ROM) or similar storage element (not shown). Those skilled in the art will appreciate that the operating system, specific device applications, or parts thereof, may be temporarily loaded into a volatile memory such as RAM 226. Received communication signals may also be stored in RAM 226.

Microprocessor 238, in addition to its operating system functions, preferably enables execution of software applications on the mobile station. A predetermined set of applications that control basic operations, including at least data and voice communication applications for example, will normally be installed on mobile station 115 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 219. In a preferred embodiment, the PIM data items are seamlessly integrated, synchronized and updated, via the wireless network 219, with the mobile station user's corresponding data items stored or associated with a host computer system. Further applications may also be loaded onto the mobile station 115 through the network 219, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 115.

In a data communication mode, a received signal such as a text message or web page download will be processed by the communication subsystem 211 and input to the microprocessor 238, which preferably further processes the received signal for output to the display 222, or alternatively to an auxiliary I/O device 228. A user of mobile station 115 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211, and stored in portions 251 of flash memory 224.

For voice communications, overall operation of mobile station 115 is similar, except that received signals would preferably be output to a speaker 234 and signals for transmission would be generated by a microphone 236. Alternative voice or audio I/O subsystems, such as a voice message recording subsystem, may also be implemented on mobile station 115. Although voice or audio signal output is preferably accomplished primarily through the speaker 234, display 222 may also be used to provide an indication of the identity of a calling party, the duration of a voice call, or other voice call related information for example.

Serial port 230 in FIG. 2, shown as 115 in FIG. 1, would normally be implemented in a personal digital assistant (PDA)-type mobile station for which synchronization with a user's desktop computer (not shown) may be desirable, but is an optional device component. Such a port 230 would enable a user to set preferences through an external device or software application and would extend the capabilities of mobile station 115 by providing for information or software downloads to mobile station 115 other than through a wireless communication network. The alternate download path may for example be used to load an encryption key onto the device through a direct and thus reliable and trusted connection to thereby enable secure device communication.

A short-range communications subsystem 240 is a further optional component which may provide for communication between mobile station 115 and different systems or devices, which need not necessarily be similar devices. For example, the subsystem 240 may include an infrared device and associated circuits and components or a Bluetooth™ communication module to provide for communication with similarly-enabled systems and devices.

Figure 3:
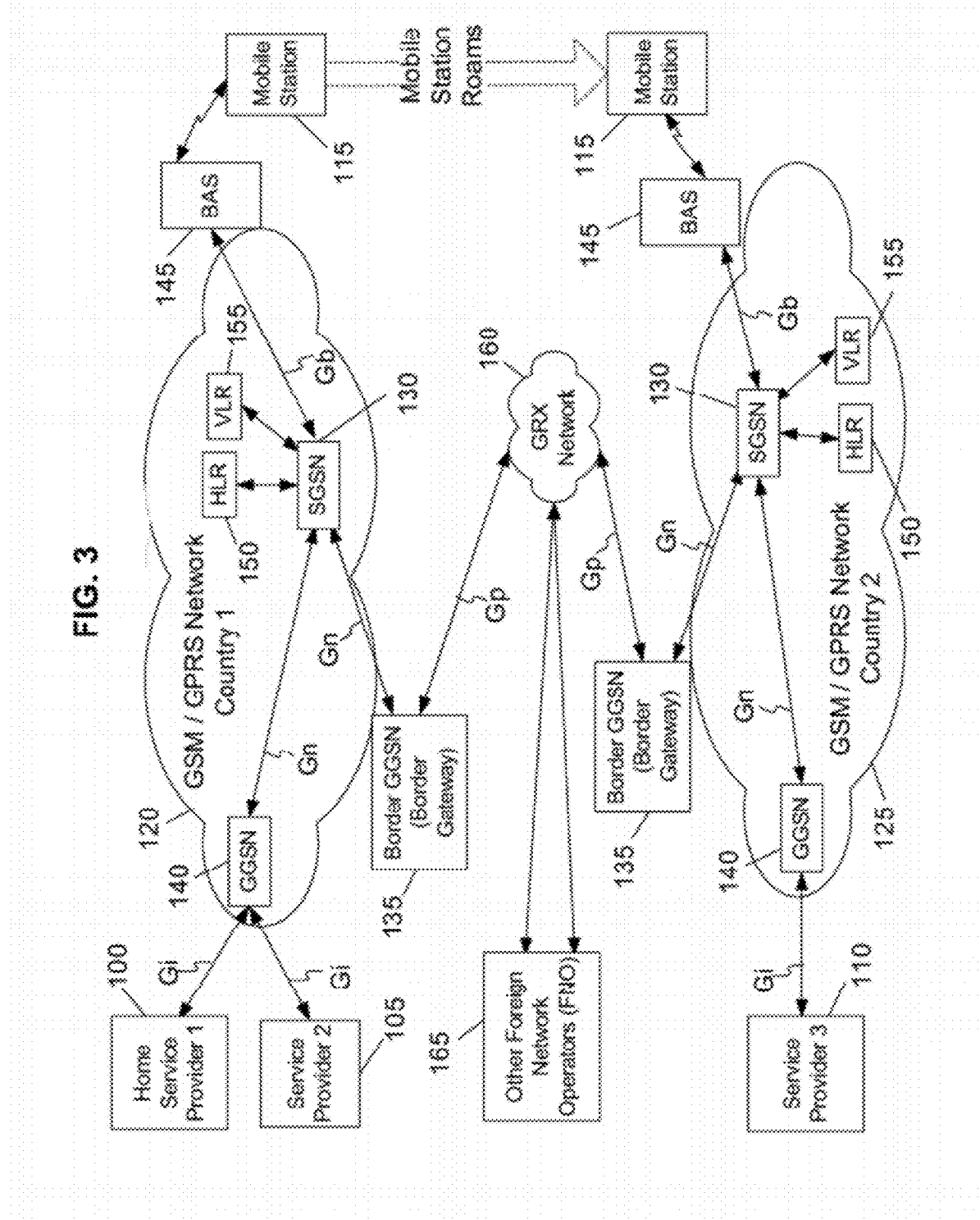
FIG. 3 is a block diagram showing two GSM/GPRS networks and a mobile station roaming between them.

FIG. 3 is a block diagram showing two GSM/GPRS networks and a mobile station roaming between them. FIG. 3 depicts a mobile station 115 roaming between two GSM/GPRS networks 120 and 125. This type of roaming arrangement is similar to how a GSM-only network might handle roaming, but with minor differences. In a GSM/GPRS combined network, a mobile station that supports only voice, only data, or a combination of voice and data will be treated similarly with respect to roaming between networks. A mobile station entering a given area or country can detect the GSM and GSM/GPRS networks through special RF radio channel interactions. The illustration of FIG. 3 provides a quick reference summary to describe how the process works. Roaming relationships between operators are established mainly for billing issues. Special Inter operator tariff (IoT) arrangements can be established between operators for GSM traffic only, or GSM and GPRS traffic. It is these relationships that are reflected in the PPLMN and FPLMN lists within the mobile station SIM cards.

GSM/GPRS Network 1 is the home network 120 for the user of mobile station 115. The home network for the user is referred to as the home public land mobile network (HPLMN) and mobile stations registered within that network are maintained in a home location registry (HLR) 150. HLR 150 is used to verify subscribers on the home network, and to confirm home subscribers on other networks. Each wireless network supports a range of services where each of the service access points tends to be a fixed connection, not a radio-based connection. Fixed connections generally allow greater capacity of data throughput for a large number of service subscribers supported by a single Access Point Name (APN). In FIG. 3, one such service is termed a home service provider 100, as it might be the primary communications service for a given group of mobile stations 115. Some mobile stations 115 might have a single home service provider 100, or they might have several services 105, 110 that they access.

The main components in GSM/GPRS network 125 include base station 145, the serving GPRS support node (SGSN) 130, the gateway GPRS support node (GGSN) 140, the Border GGSN node 135, the HLR (home location registry) 150 and the VLR (visitor location registry) 155.

Conventionally, when mobile station 115 is within a coverage area of home network 120, it communicates via base station 145 back through network 120 to home service provider 100. When mobile station 115 is looking for coverage, especially when there might be several networks available, it normally checks for the HPLMN first. As the user roams to another country or region where home network 120 is no longer available, mobile station 115 scans for all available base stations 145 via received, normally radio frequency (RF), signal strengths. To one skilled in the art, it is understood that selecting a 'strong enough' RF signal strength is open to a wide range of settings and interpretations. As an example, the GSM standards specify that a signal strength of −85 dBm or more should be considered an appropriate level for a 'strong enough' signal. However, this exact signal level is not essential to the systems and methods described herein, and other values may be useful, depending upon the particular network, mobile station or type of network or mobile station.

Those skilled in the art will appreciate that such scanning processes have pre-defined patterns. In a GSM or GPRS network, for example, scanning operations are defined in the standards governing GSM mobile stations. There is some flexibility in the standards, allowing a user to have some participation in the selection of a network to be used outside of the HPLMN. Each network is defined as a PLMN, and the relationship between PLMNs can be defined in tables within mobile station 115. Once mobile station 115 has identified base stations 145 and thus the networks within its range, it turns to the PPLMN list to see if one of the networks matches a network in the PPLMN list.

In conventional GPRS mobile stations, there are two types of PPLMN lists within the mobile station 115, namely an O-PPLMN and a U-PPLMN as shown in FIG. 2. The user-defined list is a relatively new concept and is in limited use at the current time. Similarly, mobile station 115 also has a Forbidden PLMN (FPLMN) list which it uses to exclude certain network connections. There is also a chance that a network located during a scanning operation does not fall into either of these lists. In this case, the network can preferably still be used in response to a confirmation by a mobile station user, through a dialog box for example, as to which network should be used.

GPRS networks are normally linked through a GPRS routing exchange (GRX) 160 and a border GGSN 135. The signaling involved with this exchange is described herein to the extent necessary to illustrate aspects of the present disclosure. Further details of GRX 160 may be apparent to those skilled in the art, and can also be found in the GSM specifications dealing with support for roaming in GPRS (GSM specification 23.122).

When mobile station 115 experiences a prolonged out-of-coverage situation, it begins to look for RF signals from base stations 145. Once a signal is acquired, the radio protocols inform mobile station 115 which network has been reached and the capabilities of that network. Each network has a signature, and a GPRS-capable base station has an extended handshake protocol beyond the GSM protocol to identify its data capabilities. Within a GSM/GPRS network there exists a mobile country code (MCC) and a mobile network code (MNC) which contains a network assigned value and an access technology number. The access technology number indicates the radio frequency range of the network, i.e. 900 MHz, 1800 MHz, 1900 MHz, etc.

As mobile station 115 selects a network, it performs an "attach" to the network and provides its identification code. For GSM/GPRS, this code could include both the International Mobile Subscriber Identity (IMSI) or Temporary Mobile Subscriber Identity (TMSI), which identify a communication network account or subscription, and a Mobile Station ISDN/PSTN Number MSISDN, which identifies the mobile station user or subscriber. If mobile station 115 is attempting to attach to a network other than its home network 120, such as network 125, then the other network 125 will use the GRX network 160 to verify the subscription with home network 120. This causes home network 120 to reference HLR 150 to determine if the subscription is valid. Once verified, mobile station 115 is placed in VLR table 155 of visiting network 125. To one skilled in the art, this procedure is similar in a GSM-only network, except that the link between the home and visiting networks would be through a Gateway Mobile Switching Center (MSC) component.

After attaching to network 125, mobile station 115 will attempt to open a Packet Data Protocol (PDP) context to home service provider 100 through the local SGSN 130 in GSM/GPRS network in country-2 125. The PDP context targets an APN and home service 100. The PDP context also allocates an IP address for mobile station 115 so that IP packets can be transmitted in either direction. SGSN 130 detects mobile station 115 as a visiting mobile station 115 and routes the request through border GGSN 135 and onward to the correct GRX connection in GRX network 160 to a corresponding border GGSN 135 in home network 120. As mentioned above, this determination is made by the identification information provided by mobile station 115 during the attach process.

Each interface in the GSM/GPRS network is labeled to identify which protocol is used. Between all base stations 145 and SGSN 130, is the Gb interface. Between SGSN 130 and GGSN 140 is the Gn interface, which is also used between SGSN 130 and border GGSN 145. Between GGSN 140 and all service providers, the Gi interface is used, and between border gateways 135 and GRX network 160, the Gp interface is used. From GRX network 160, all other foreign network operators (FNO) systems 165 can be reached, assuming they have commonly linked GRX networks.

GSM network standards specify particular steps that mobile station 115 must perform to select a base station 145 in GSM/GPRS network in country-2 125. First, mobile station 115 must achieve a certain minimum level of signal strength with the base station. Once signal strength is established and the networks associated with each base station which meet the minimum signal strength criterion are identified, mobile station 115 uses its PPLMN and FPLMN lists on the SIM to determine what it considers the "best" network choice. Mobile station 115 checks the PPLMN list to see if one of the newly located networks matches a network on the PPLMN list. Similarly, mobile station 115 also checks the FPLMN list to determine which networks are forbidden. If any of the newly located networks occur in the FPLMN, then those networks are excluded from any further connection operations. If there are no matches to the PPLMN list, mobile station 115 may attempt to select one of the recently located networks based on signal strength.

Figure 4:
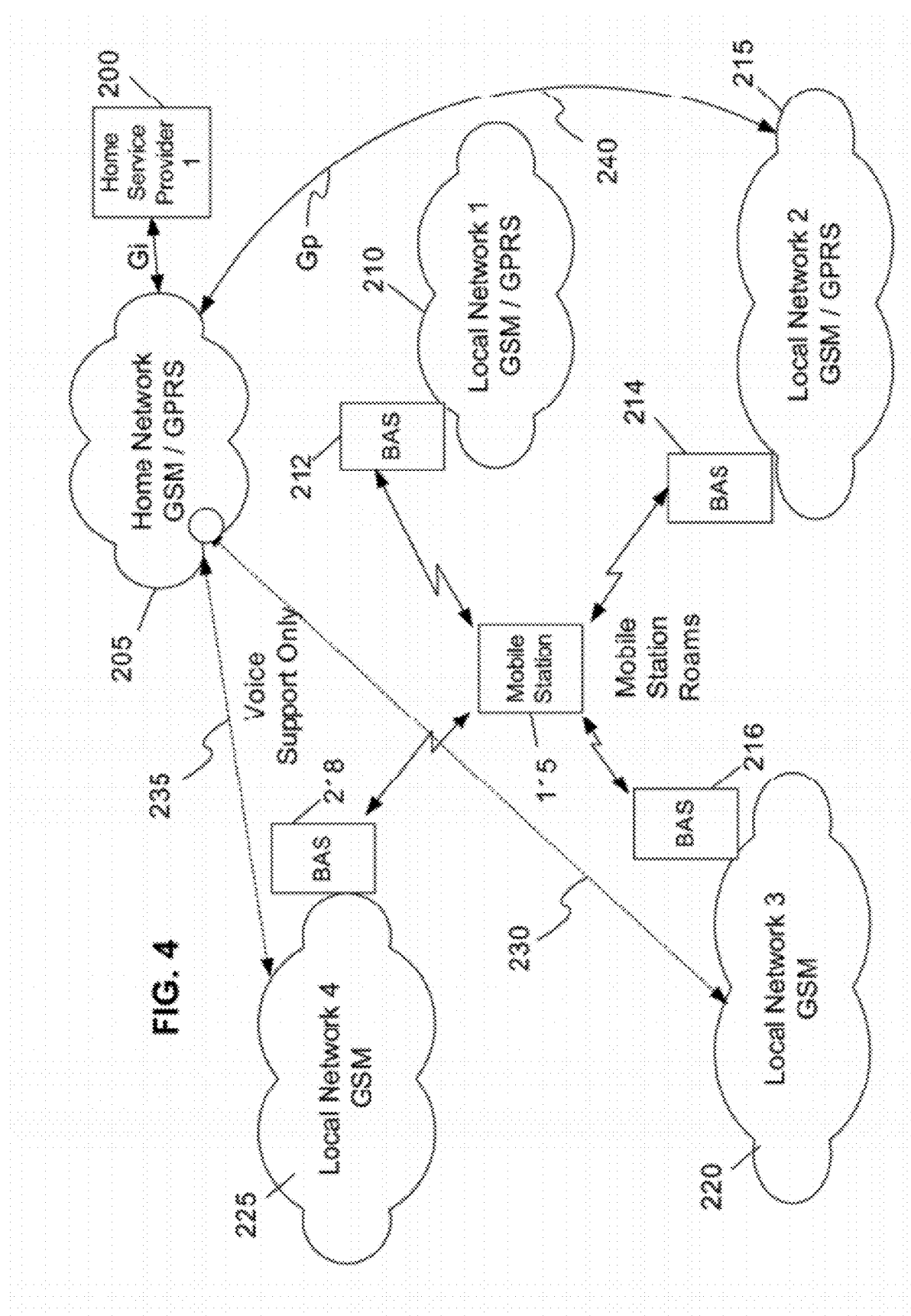
FIG. 4 is a block diagram illustrating a mobile station in a region where there are several communication networks of different types.

FIG. 4 is a block diagram illustrating a mobile station in a region where there are several networks of different types. In FIG. 4, mobile station 115 is shown in a region with four networks 210, 215, 220, 225, each having a base station 212, 214, 216, 218. For illustrative purposes, it is assumed that each base station 212, 214, 216, 218 has similar RF strength from the point of view of mobile station 115, and that mobile station 115 receives "strong enough" signals, from Local Network 1 210, Local Network 2 215, Local Network 3 220, and Local Network 4 225. Two of the networks 210 and 215 are GPRS capable and two of the networks 220 and 225 are GSM-only networks that are not GPRS capable.

According to the present application, in order for mobile station 115 to maximize its capabilities as a multi-functional mobile station (e.g. capable of both data and voice communication services), it should select one of the GPRS networks 210 and 215. In conventional GSM operation, mobile station 115 would compare all networks from which received signals are above any minimum required signal strength level and match them against the top-most network found in the PPLMN. Since the PPLMN is in priority order, a GSM mobile station must, by definition, follow the ordering of this list. In FIG. 4, for example, if Local Network 4 225 is the highest network listed in the PPLMN list then mobile station 115 must camp on this network. However, this process ignores the fact that mobile station 115 might also be data-capable. The choice of Local Network 4 225, which does not support data communications, may therefore not always be optimal for mobile station 115.

To improve the capabilities of mobile station 115, the search for a better network preferably takes other factors into consideration. Since mobile station 115 cannot effectively communicate when signal strength is below a certain level, only network base stations with 'strong enough' signals are located, substantially as described above. According to one aspect of the present disclosure, data-capable networks, such as GPRS networks, are then identified. Mobile station 115 may then determine which of the identified data-capable networks is listed first on a preferred network list, which in GSM/GPRS mobile stations would be the PPLMN list. Mobile station 115 then checks to ensure that an interconnection, such as a GRX network for a GPRS network, is available to the home network from this highest-priority data-capable network on the preferred list. If no interconnection to the home network from the highest priority data-capable network is available, then mobile station 115 continues to try the identified data-capable networks that are also in the preferred list until a link is found back to the home network.

If no links can be found that connect to the home network, then mobile station 115 may revert to traditional network selection of a non-data-capable network such as a GSM network, as described above. Alternatively, the network selection method might stop after scanning all data-capable networks for links to the home network. This may be particularly desirable when the data-capable networks have more capabilities compared to a non-data-capable network. In some circumstances, even if a user cannot reach their home network, they may be able to better use the mobile station on the new network, for example, to access the Internet at large.

Referring again to FIG. 4, mobile station 115 normally has access to a preferred network list in the form of a PPLMN stored on a SIM card. Data-capable networks include the GSM/GPRS Local Networks 1 and 2, 210 and 215, whereas the GSM Local Networks 3 and 4, 220 and 225, represent examples of non-data-capable networks.

If mobile station 115 performs the network selection method described briefly above, and it is assumed that the PPLMN list follows the ordering of the networks shown in FIG. 4, the first network that should be attempted is the Local Network 1 210. However, since Local Network 1 210 does not have a GRX connection back to the home PLMN 205, Local Network 2 215 will be tried next. Since this network does have a Gp link 240 back to home PLMN 205 and home service provider 200, it will be selected by mobile station 115. If Local Network 2 215, the last available data-capable network, did not have a connection back to home PLMN 205, the first GSM network would be tried. The first GSM network tried would be Local Network 3 220, and link 230 would be used to communicate with the HLR in that home PLMN 205 to verify the user's account information. If that fails, Local Network 4 225 would be tried via link 235.

In another embodiment of FIG. 4, the new networks 210, 215, 220, 225 are not included on the O-PPLMN list on mobile station 115. This situation is more difficult, as the U-PPLMN list may come into effect, if it exists, in a memory such as the Flash memory 224 or the RAM 226 (FIG. 2).

One common way to build up a U-PPLMN is through previous user or "manual" network selections. As in the above example of FIG. 4, it is assumed that mobile station 115 has entered a country or region where it receives signals of similar strengths from the four networks 210, 215, 220 and 225. However, it is further assumed that these networks are not found on the O-PPLMN list or the FPLMN list, so mobile station 115 may consider them to be usable. In this situation, once these networks are identified, the user may be prompted to choose which network they would like to try. In the GSM specifications this is referred to as manual network selection. After the user has selected a network, it is tried for connectivity back to home network 205 and, if successful, it is added to the U-PPLMN.

The user interface (UI) to these manual network selections could be a standard dialog box, a pick list, a scrolling menu, or any other UI selection models available. It will be apparent to those skilled in the art that the UI could also include the network capabilities by showing capability identifying strings such as "GPRS" or "GSM" beside each of the network choices for the user. In another embodiment, the user might be presented with a dialog box entitled "GPRS Network Selections" followed by "GSM Network Selections" if all the GPRS networks failed to reach the home PLMN.

Network selection in this situation could instead be automatic, not requiring user intervention. In such a method, mobile station 115 preferably identifies the networks that support GSM and those that support GSM/GPRS and separates the two types of networks. The GSM-only networks are placed on a Discouraged PLMN list (DPLMN) and are only tried after all the GSM/GPRS networks have been tried and failed. The only failure mentioned thus far was around the inability to reach home PLMN 205. Other failures could include: (1) PLMN not allowed; (2) roaming not allowed in this local area; (3) GPRS not allowed; or (4) home network rejection. These errors and others might cause the network to be placed on the FPLMN, as the network link does not seem to be working for mobile station 115.

Manually or automatically selected networks are preferably added to the U-PPLMN list, which may be stored in a writable data store such as Flash memory 224 or RAM 226 (FIG. 2) in mobile station 115. The U-PPLMN list may then be consulted during subsequent network selection procedures. Normally, mobile station 115 will first check the O-PPLMN list for new networks detected during a network selection process before consulting the U-PPLMN list. It may also be possibly to configure a mobile station to check the U-PPLMN list before the O-PPLMN list, depending, for example, upon restrictions controlled by the home network operator, a home service provider, or a mobile station owner.

Rescanning. According to current GSM specifications, a mobile station has only the limited ability to rescan for a network that is higher in priority on the U-PPLMN list or the O-PPLMN list. If a voice-only GSM or otherwise limited service has been established for a mobile station, however, it may be desirable for the mobile station to periodically check for a new network such as a GSM/GPRS network. This may be done even if the network has a lower priority on the O-PPLMN and U-PPLMN lists. This situation may also arise for other types of mobile stations and networks, where a mobile device is enabled for communications over different types of networks which support different mobile station functions or services.

In FIG. 4, mobile station 115 enters a new region or country and finds coverage (i.e. a 'strong enough' signal) with only one GSM-only base station located on Local Network 4 225. However, as mobile station 115 travels within the same country it may come into coverage of another GSM/GPRS base station, in Local Network 1 210. In GSM standards, mobile station 115 could only camp on the network 210 if it had higher priority in the PPLMN lists. In accordance with the present application, however, mobile station 115 will attempt to rescan for other data-capable networks not previously seen or available upon expiration of a time period or other suitable event. This includes any network that may be lower in priority on the O-PPLMN and U-PPLMN lists. This time interval may be specified or configured by a network operator, SIM manufacturer, network specifications, mobile station manufacturers, or a user of mobile device 115, as examples. The goal of such rescanning is to improve the network capabilities of mobile station 115. In this example, mobile station 115 has voice support through the Local Network 4 225, but by changing network connections mobile station 115 could obtain data and voice support through Local Network 1 210.

A rescanning process may be triggered or initiated by any suitable event. For example, in the case of an interval timer, a rescanning process may be executed whenever a rescan timer expires. Such a timer is reset appropriately so that rescanning is performed at intervals. If the timer is reset to the same value unless or until the time interval is reconfigured, rescanning will occur at regular intervals. Rescan timing could instead be repeated at different intervals, if the timer is reset to different values after some number of unsuccessful rescan operations during which no new data-capable network is found. In order to avoid rescanning at typically high network traffic times, rescanning could also be restricted during certain times of day. Rescanning could also or alternatively be performed when a mobile station detects a change in regions, or when a mobile station acquires a voice-only network connection in new region. If the mobile station detects an available network capable of both voice and data communications, then the mobile station preferably attempts to camp on this network. Received signal strengths and PPLMN lists may be used substantially as described above during a rescan process. Since a primary goal of the rescanning process is to find an available data communication service for the mobile station, rescanning is preferably disabled when a mobile station is already operating within a network which has the data communication service already available.

When a current network is on the O-PPLMN list or the U-PLMN list, and a newly discovered network is not on the PPLMN list, the mobile station may remain on the current network instead of switching to a new network. It is likely that most GSM/GPRS networks have been included somewhere on the O-PPLMN list or possibly the U-PPLMN list. A network change during a rescan process may also be dependent upon relative signal strengths to avoid switching from a strong GSM network to a significantly weaker GSM/GPRS network. Acceptable signal strength differences may be stored, for example, in a memory of a mobile station.

Figure 5:
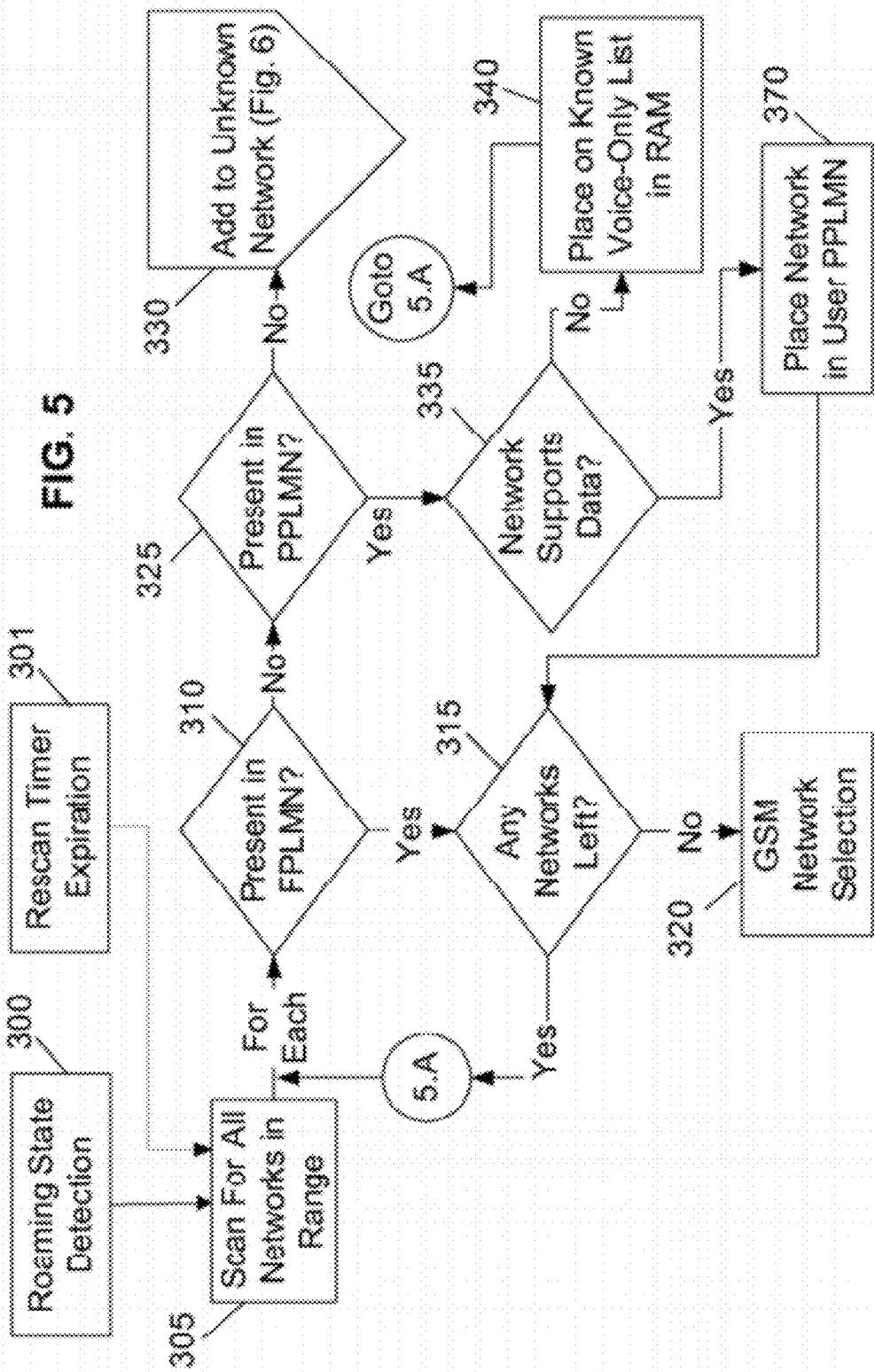
FIGS. 5 and 6 form a flowchart which describes a method of creating a prioritized network list in accordance with the present application.
Figure 6:
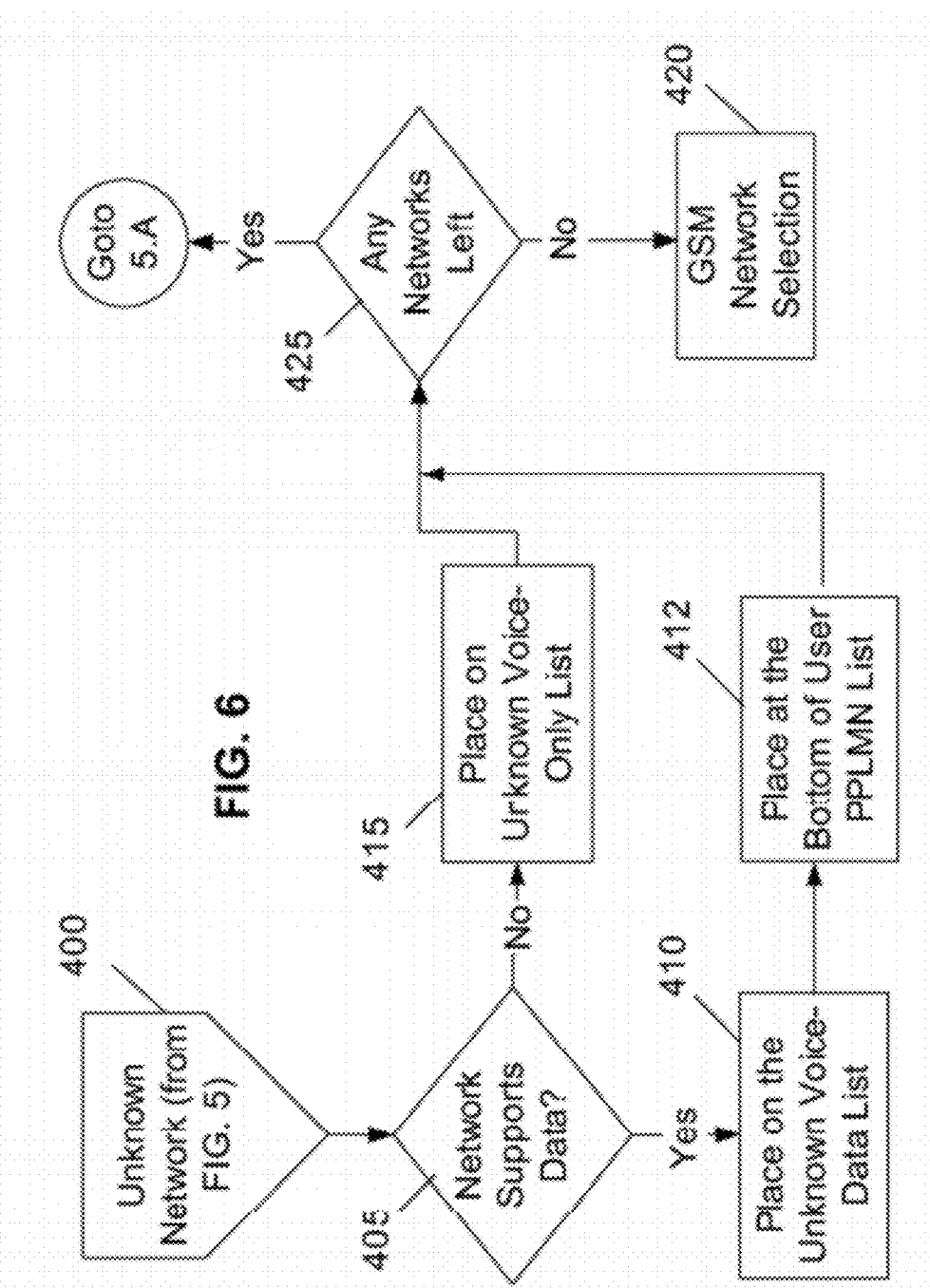

Network Selection Using PLMN Lists. FIGS. 5-6 form a flowchart showing a method of selecting a network for use with a mobile station. The method shown in these figures relates to GSM/GPRS mobile stations and GSM and GSM/GPRS networks, although the method may be applied in other environments in which mobile stations and networks offering different kinds and levels of services exist. The method steps shown in FIGS. 5-6 may be implemented, for example, primarily in software on a mobile station.

In step 300 of FIG. 5, the mobile station detects that it has left a region where the HPLMN is available. This could be a national roaming situation or an international roaming situation. On the other hand, the mobile station may detect an expiration of a rescan timer in step 301. In response to either of these conditions, the mobile station scans for all networks in range at step 305 with the goal of establishing a prioritized list of networks. Each network identified will be tested at step 310 to ensure that the network is not found on the FPLMN list. If the network is on the FPLMN list, it is ignored, and a test is performed at step 315 to determine if any other networks previously identified in step 305 remain to be checked against the FPLMN list. If there are no networks remaining, then at step 320 GSM network selection algorithm as outlined in Specification 23.122 ("GSM Network Selection") commences. If there are additional networks to test, then the method repeats beginning at step 5A and the next network on the list is checked as previously described.

If the network is not on the FPLMN list, then a check is made at step 325 to see if it is on one of the two PPLMN lists. If not, then the network is placed in the unknown network list 330, as described in FIG. 6. If the network is on one of the PPLMN lists, a further check is made at step 335 to see if it supports a data communication service. If it does not support the data communication service, or if the data communication service is unavailable, then at step 340 the network is placed on the known voice-only list of networks maintained in memory of the mobile station. Processing then returns to step 5A to check for additional networks. If the network does support the data communication service, then it will be added to the U-PPLMN list at step 370 and processing returns to step 5A.

Turning now to FIG. 6, the flowchart has one entry point from FIG. 5 as shown. Entry point 400 handles registering unknown networks that are found during scanning. If an unknown network is detected, then the first test is to determine whether it supports data communication service at step 405. If it does support the data communication service, e.g. GSM/GPRS, it is added to an 'Unknown Voice-Data List' in memory such as RAM 226 (FIG. 2) at step 410. Since it is a voice-data network, at step 412 it is added at the bottom of the User PPLMN list (as low priority since it is unknown). If the unknown network is a voice-only network at tested at step 405, then at step 415 the network is placed on an 'Unknown Voice-Only List' which is also stored in memory. Once the unknown network is added to an unknown networks list, the mobile station tests to see if there are any more networks to be tried at step 425. If there are other networks to be tried, then the method continues at step 5A in FIG. 5. If there are no remaining networks to be tried, then the method ends and the GSM Network Selection at step 420 commences.

More on Rescanning. The network rescan timer is a timer that is started when the camped-on communication network is not the home network. Thus, if the mobile station camps on a communication network other than the home network, the rescan timer is started. When a timeout occurs, the selection technique initiates a search for the home network, selects and camps on the home network if found, and resets the timer should the home network not be found.

Figure 7:
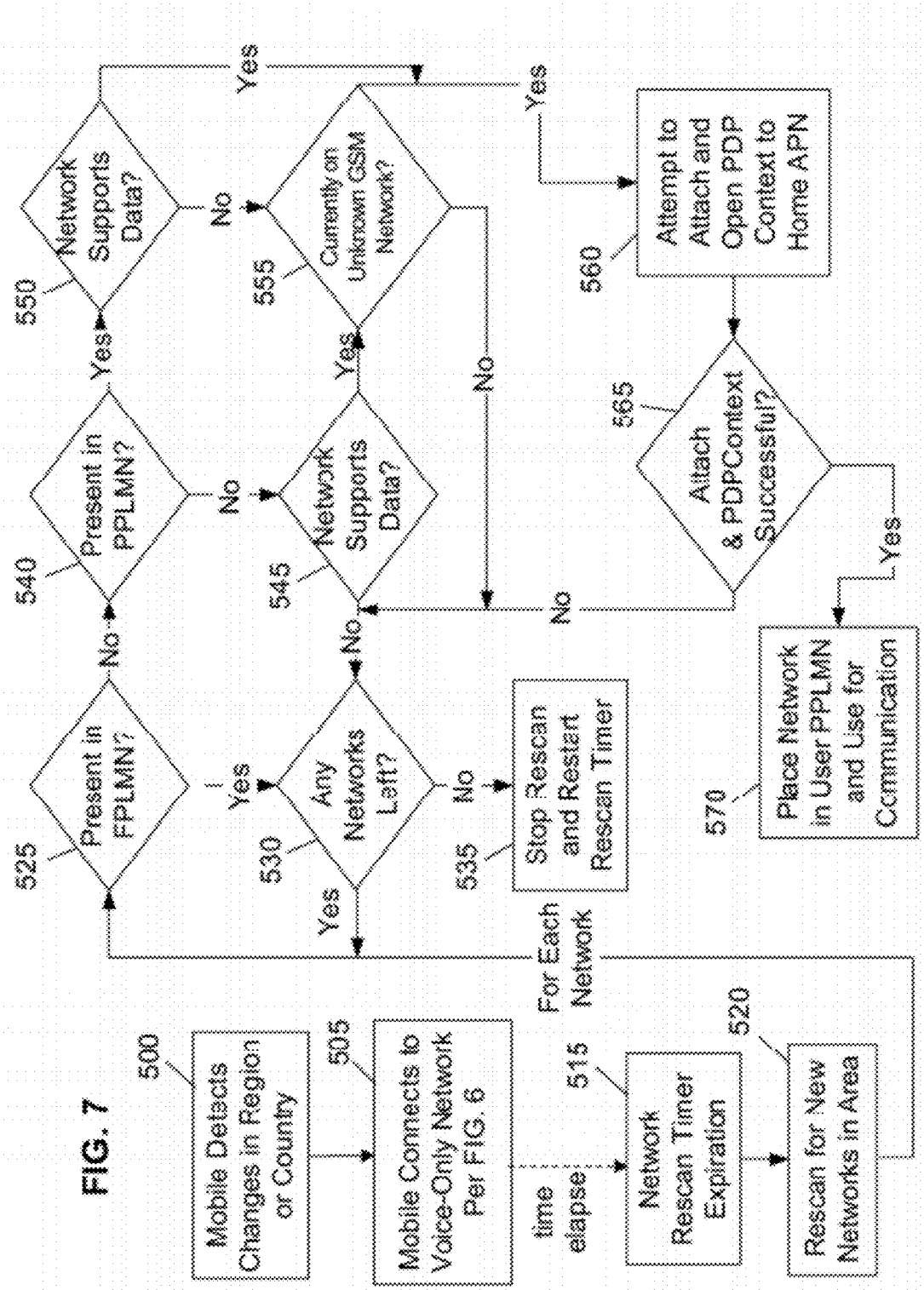
FIG. 7 is a flowchart which describes a rescanning method in accordance with the present application.

FIG. 7 is a flowchart which describes a rescanning method of the present application. As described above in connection with FIGS. 5-6, the method of FIG. 7 may be implemented in software on a mobile station. In step 500 of FIG. 7, the mobile station detects a country or region change. In step 505, it results in the mobile station camping on a voice-only network, which is neither the home network nor a known voice-data network. After some time lapses, the rescan timer expires at step 515 which triggers a rescan for new networks in the area at step 520. The rescanning process provides an opportunity for a mobile station to find a network that is known or offers better services to the mobile station user. A network offering better services could be considered in order of decreasing capability to be: a known voice and data network, a known voice-only network, an unknown voice-data network, and finally an unknown voice-only network.

For each network found, a test is made to see if the network is on the FPLMN list at step 525. If the network is on the FPLMN list, then a test is performed at step 530 to see if all networks have been retried. If there are more networks to try in step 530, the testing continues. Otherwise, if there are no more networks to try, the rescan is stopped and the rescan-timer is reset at step 535. If the network found was not on the FPLMN list, then a test is performed at step 540 to see if the network is on one of the PPLMN lists. If it is not on one of the PPLMN lists, then a further test is performed at step 545 to see if it is a data-capable network. If the network is unknown and is not a data network, then the method may return to step 530 to check for other networks. This is because an unknown voice-only network with better signal strength can be better the voice-only network already in use.

If the network is data-capable, however, then it falls into the category of an unknown data network which could potentially be better than an unknown voice network. To verify this, the mobile station tests at step 555 to see if the currently camped-on network is an unknown voice network such as a GSM network. If this is not the case, then the current network is as good as or better than the found network, so the method returns to step 530 to check if any other networks were found. If the mobile station verifies that the current camped-on network is an unknown voice-only network, then the newly discovered unknown data network will be used in place of the current network, as indicated at step 560. If one of these operations fails, as determined at step 565, the method will return to step 530 to scan for other data networks. If the attach is successful, then the network is placed in the U-PPLMN list and the network is used for communications 570.

Returning to step 540, if it is determined that the network is known in the PPLMN list, the method then checks to see if the network supports data, at step 550. If the network does not support data, an extra check is performed at step 555 to see if the current network is an unknown voice only network, i.e. GSM, as described above. When a known GSM network has been identified, it should be substituted for a current unknown GSM network. If the current network is an unknown GSM network, or if the new network is a known data network like GSM/GPRS, then the mobile station will attempt to attach to the new network and open a PDP context to the home APN at step 560. If the attach or PDP context creation fails, then the method returns to step 530 to check any other networks that were found. Otherwise, the network is accepted, added to the user PPLMN list and used for communications at step 570.

FIG. 8 is a flowchart which describes an alternate rescanning method. Steps 500 through 520 are the same as those described in relation to FIG. 9. When arriving at step 520, however, the embodiment depicted in FIG. 8 returns to the method revealed in FIGS. 5-6 ("Goto 5A"), establishing a prioritized list which the GSM Network Selection will use to select a network. The method described in FIGS. 5-6 will then be performed, providing a more desirable network for the mobile station.

Network Selection Using A Service Access List. FIG. 9 is a flowchart which describes an alternate method of providing for network selection in a mobile station. In this method, conventional network selection is performed in connection with conventional PLMN lists but thereafter the selection is cross-checked against other preferable networks (e.g. data communication available networks) which may be listed in a separate "service access list". It is noted that separate service access lists may be kept on a per region basis (e.g. per MCC) to improve performance.

In step 1100 of FIG. 9, the mobile station is registered with a particular PLMN and operates in an idle mode where it camps on a particular wireless channel of one of PLMN's base stations. If poor cell conditions exist, or if a better cell is available, then conventional GSM network selection is performed in step 1102 in an attempt to pick a new PLMN. This step includes performing the scanning process and prioritized PLMN selection using conventional PLMN lists. If the PLMN selected in step 1102 is the home PLMN, or the same PLMN already registered with, then the mobile station continues to operate on the PLMN in step 1100 after resetting the rescan timer in step 1106 if full communication services are still unavailable.

If a new PLMN is selected in step 1102, the newly selected PLMN is searched for within the service access list in step 1104. If the new PLMN is found in the service access list, then the mobile station attempts to connect through the network to access a data communication service in step 1110. The data communication service may be, for example, that service offered by the mobile station's home network. Step 1110 may be performed more specifically by sending a "request for service" packet to a server on the mobile station's home network. If unable to actually access the service, the PLMN is removed from the service access list in step 1112 and the method continues at step 1108. The mobile station will know that the data service is unavailable when, for example, it receives a non-delivery notification or no acknowledgement from the home network server within a specified period of time.

If the newly selected PLMN is not found in the service access list in step 1104, or after being unable to connect through a network and removing the network from the service access list in steps 1110 and 1112, then a PLMN listed in the service access list is searched for within the current scan list in step 1108. If the PLMN is found in the scan list, then the mobile station attempts to connect through the network to access a data communication service in step 1110, as described previously. The method may also be invoked beginning at step 1108 when the rescan timer has expired in step 1126 and a new scan list in 1128 is generated.

If the PLMN in the service access list is not found in the current scan list in step 1108, then in step 1114 the mobile station sorts the scan list for those PLMNs that support the data communication service. In step 1116, the mobile station then attempts to actually connect through the network to access a data communication service, for all of the PLMNs in the sorted scan list. If the mobile station can establish the data connection with the PLMN for the data communication service, it "passes" and the PLMN is added to the service access list in step 1120. If the mobile station cannot establish the data connection in step 1116, it "fails" and the mobile station selects the most-capable network in step 1118 as is conventional. If there is a tie between networks, the mobile station selects the network having the strongest signal to break the tie in step 1122. After steps 1118, 1120, and 1122, the method continues at step 1106 to set the rescan timer through a connector A 1124. The description in relation to FIG. 11 ends.

More Generalized Approaches. In a more generalized approach, a mobile communication device provides several different features and functions which require associated network services. Advantageously, its network selection technique takes into account the availability of all of these services. To illustrate, the mobile device may provide an end-user with features offered via communication networks which include, but are not limited to, a voice communication service, an electronic mail (e-mail) service, a short messaging service (SMS), an Internet access service, a private Intranet access service, a wireless application protocol (WAP) service, a local data facilitating service, a home data facilitating service, and application-specific data services such as a weather service, a horoscope service, and a stock market quotations service. Additional services may be distinguished by the relative quality differences between otherwise similar services, for example, a high-speed Internet service versus a low-speed Internet service.

In the present approach, the mobile device identifies one or more communication networks available for communication within a geographic coverage area. The mobile device may perform this step using a conventional scanning operation. Next, the mobile device identifies one or more communication services made available by each one of these communication networks. These communication services may be or include any of the services listed above, or other suitable services. Each communication network may have only a subset of communication services available for the mobile device. Preferably, the mobile device identifies the availability of these services at least in part by actually attempting to access the service in the network.

Next, the mobile device selects communication networks in a prioritized fashion based on the communication services that are made available by it. Preferably, the mobile device selects or gives first priority to a communication network that makes available the best or the most communication services for the mobile device. It is this network that the mobile device may register and operate with. If assigning priorities, the mobile device preferably keeps a prioritized network list of networks from the "best" to "worst". The "best" network may be the one that provides the greatest number of communication services for the mobile device. Correspondingly, the "worst" network may be the one that provides the least number of communication services.

Alternatively, the "best" network is the one that provides the greatest number of "preferred" communication services for the mobile device. Here, the one or more "preferred" communication services may be predefined by the network, predefined by the mobile device manufacture (stored in the device's memory), or predefined by the end-user who programs such service priorities via the user interface. In another variation, each communication service is preassigned a relative weight value and a sum of relative weight values for available communication services in each network is calculated. Here, the "best" network is the one having the largest sum of weight values, and is kept at the top of a prioritized network list having the "best" to the "worst" networks. Additional weightings may be used as well for these decision-making process, including success rate, data throughput rate (specified or actual), and cost.

As an extra feature in the mobile communication device, any of the inventive network selection methods described herein may be performed only when the mobile device is in a special mode of operation. This special network selection mode may be called a "PREFERRED" network selection mode, and may be provided in addition to the "AUTOMATIC" and "MANUAL" network selection modes of the mobile device. These different modes of network selection may be displayed on a visual display of the mobile device so that an end-user may select one of them. Alternatively, the mode of network selection may be pre-programmed by the manufacturer of the mobile device.

As apparent, the above-described methodologies can be employed in the GSM-specific techniques previously described in relation to the flowcharts.

Summary/Advantages. Thus, methods and apparatus for selecting a cellular network to provide one or more communication services for a mobile communication device have been described herein. A scanning operation is performed by the mobile device to identify one or more communication networks which support a voice communication service in a geographic coverage area. The mobile device then determines which of the communication networks make a data communication service available for the mobile device in the geographic coverage area. Advantageously, the mobile device selects and registers with a communication network that makes the data communication service available over a network that fails to make the data communication service available. Preferably, the mobile communication devices operate in accordance with GSM (Global System for Mobile) and GPRS (Generalized Packet Radio Service). Also preferably, the method is performed in connection with the creation of one or more prioritized network lists. In this case, the mobile device assigns a higher priority in the prioritized network list to a communication network that makes the data communication service available over a communication network that does not make the data communication service available.

The method may be more generalized to involve a mobile communication device which identifies one or more communication networks available to facilitate mobile communications with the mobile device in a geographic coverage area; identifies one or more communication services that are actually made available to the mobile device in each network; determines which network provides the best communication services for the mobile device based at least in part on the identified availability of services in each network; selects or assigns priority to the network that is determined to provide the best services for the mobile device; and registers with the selected or prioritized network. The communication services which may be made available by the networks include, but are not limited to, a voice communication service, an electronic mail (e-mail) service, a short messaging service (SMS), an Internet access service, a private Intranet access service, a wireless application protocol (WAP) service, a local data facilitating service, a home data facilitating service, and application-specific data services such as a weather service, a horoscope service, and a stock market quotations service.

Advantageously, the above-described methods allow a mobile device to automatically select the best network to provide mobile communications for it. Services available for any given device and network may be maximized without user intervention. The capabilities of the devices can be continually improved as an end-user moves to ever-richer service areas. Also, several methods provide for the continued use of conventional methods and PPLMN lists. Finally, the methods also do not require active updates from the network to manage connection preferences.

It will be appreciated that the above description relates to preferred embodiments by way of example only. Many variations thereof will be obvious to knowledgeable in the field to which the techniques of the present disclosure pertains, and such variations are within the scope of the techniques as described and claimed, whether or not expressly described. For example, although the detailed description has strictly used the term "network" in context of the inventive methods (which presumes substantial homogeneity inside each network), the techniques of the present disclosure also broadly includes selecting between sub-sections of networks including network subnets and even individual cells. As another example, although embodiments of the techniques have placed an emphasis on GSM and GSM/GPRS networks, and voice and data-capable mobile stations, it should be appreciated that the techniques are not limited to such networks, mobile stations, and services. The present techniques are applicable to other systems in which mobile stations are enabled for communication services available to different extents. Finally, although the mobile device oftentimes identifies a plurality of communication networks available within its geographic coverage area, it may sometimes identify only a single available network with which to act upon; this understanding should not in any way limit the interpretation of the claims.

What is claimed is:

1. A network selection method for use in a mobile device which is configured for voice and packet data communications, the method comprising:

performing a scanning operation to identify one or more communication networks;

consulting a network selection list for selecting, in accordance with assigned priorities of the network selection list, one of the identified communication networks;

determining whether a data service interconnection to a home network is available by sending a request for data service via the selected communication network to a home network server of the home network;

when the data service interconnection to the home network via the selected communication network is determined to be available based on receipt of an acceptance of the request for data service from the home network server, operating in the selected communication network for receiving a data service using the data service interconnection; and otherwise, when the data service interconnection to the home network via the selected communication network is determined to be unavailable based on receipt of a non-delivery notification or no acknowledgement from the home network server, repeating the acts of consulting and determining for a next selected one of the identified communication networks in the network selection list.

2. The network selection method of claim 1, wherein the selected communication network comprises a non-home network.

3. The network selection method of claim 1, wherein the data service interconnection utilizes a General Packet Radio Service (GPRS).

4. The network selection method of claim 1, wherein the data service interconnection comprises a GPRS Roaming Exchange (GRX) or a Gp link.

5. The network selection method of claim 1, further comprising:

when the data service interconnection to the home network via the selected communication network is determined to be available based on receipt of the acceptance of the request for data service, adding the communication network to a network list based on the identifying.

6. The network selection method of claim 1, wherein the network selection list comprises a Preferred Public Land Mobile Network (PPLMN) list.

7. A computer program product, comprising:

a non-transitory computer readable medium;

computer instructions stored in the non-transitory computer readable medium;

the computer instructions being executable by one or more processors of a mobile communication device for selecting a communication network by:

performing a scanning operation to identify one or more communication networks;

consulting a network selection list for selecting, in accordance with assigned priorities of the network selection list, one of the identified communication networks;

determining whether a data service interconnection to a home network via the selected communication network is available by sending a request for data service via the selected communication network to a home network server of the home network;

when the data service interconnection to the home network via the selected communication network is determined to be available based on receipt of an acceptance of the request for data service from the home network server, operating in the selected communication network for receiving a data service using the data service interconnection; and otherwise, when the data service interconnection to the home network via the selected communication network is determined to be unavailable based on receipt of a non-delivery notification or no acknowledgement from the home network server, repeating the acts of consulting and determining for a next selected one of the identified communication networks in the network selection list.

8. A mobile communication device configured for voice and packet data communications, the mobile communication device comprising:

a radio frequency (RF) transceiver;

one or more processors coupled to the RF transceiver;

memory coupled to the one or more processors;

the one or more processors being configured to:

cause a scanning operation to be performed with the RF transceiver to identify one or more communication networks;

consult a network selection list for selecting, in accordance with assigned priorities of the network selection list, one of the identified communication networks;

determine whether a data service interconnection to a home network via the selected communication network is available by sending a request for data service via the selected communication network to a home network server of the home network;

when the data service interconnection to the home network via the selected communication network is determined to be available based on receipt of an acceptance of the request for data service from the home network server, operate in the selected communication network for receiving a data service using the data service interconnection; and otherwise, when the data service interconnection to the home network via the selected communication network is determined to be unavailable based on receipt of a non-delivery notification or no acknowledgement from the home network server, repeat the actions of consulting and determining for a next selected one of the identified communication networks in the network selection list.

9. The mobile communication device of claim 8, wherein the selected communication network comprises a non-home network.

10. The mobile communication device of claim 8, wherein the packet service interconnection utilizes a General Packet Radio Service (GPRS).

11. The mobile communication device of claim 8, wherein the data service interconnection comprises a GPRS Roaming Exchange (GRX).

12. The mobile communication device of claim 8, wherein the one or more processors are further configured to:

when the data service interconnection to the home network via the selected communication network is determined to be available based on receipt of the acceptance of the request for data service, add the communication network to the network list based on the identifying.

13. The mobile communication device of claim 8, wherein the network selection list comprises a Preferred Public Land Mobile Network (PPLMN) list.

14. A network selection method for use in a mobile communication device while roaming outside of its home network, the mobile communication device being configured for voice and packet data communications, the method comprising:

performing, at the mobile communication device, a scanning operation to identify one or more communication networks;

consulting, at the mobile communication device, a network selection list for selecting, in accordance with assigned priorities of the network selection list, one of the identified communication networks;

after the selection of the one of the identified communication networks, attempting, at the mobile communication device, to connect back to the home network from the selected communication network over a Gp link;

when the Gp link between the selected communication network and the home network is available, operating the mobile communication device in the selected communication network for receiving data service, from the home network to the selected communication network, over the Gp link; and otherwise, when no Gp link between the selected communication network and the home network is available in response to the attempt, repeating the acts of consulting and attempting for a next selected one of the identified visited networks in the network selection list.

15. The network selection method of claim 14, wherein the selected communication network comprises a non-home public land mobile network (PLMN).

16. The network selection method of claim 14, wherein the data service comprises a General Packet Radio Service (GPRS).

17. The network selection method of claim 14, wherein the network selection list comprises a Preferred Public Land Mobile Network (PPLMN) list.

18. The network selection method of claim 14, wherein the communication networks comprise Public Land Mobile Networks (PLMNs).

* * * * *